(12) United States Patent
Lewke (10) Patent No.: US 9,097,238 B2
(45) Date of Patent: Aug. 4, 2015

(54) LIGHTNING PROTECTION FOR A NACELLE OF A WIND TURBINE

(75) Inventor: Bastian Lewke, Herning (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 635 days.

(21) Appl. No.: 13/505,842

(22) PCT Filed: Feb. 23, 2010

(86) PCT No.: PCT/EP2010/052278
§ 371 (c)(1),
(2), (4) Date: May 3, 2012

(87) PCT Pub. No.: WO2011/057828
PCT Pub. Date: May 19, 2011

(65) Prior Publication Data
US 2012/0219420 A1    Aug. 30, 2012

(30) Foreign Application Priority Data

Nov. 12, 2009 (EP) .................................... 09014181

(51) Int. Cl.
*F03D 11/00* (2006.01)

(52) U.S. Cl.
CPC .......... *F03D 11/005* (2013.01); *F03D 11/0033* (2013.01); *F05B 2240/14* (2013.01); *Y02E 10/722* (2013.01); *Y02E 10/726* (2013.01)

(58) Field of Classification Search
CPC ............ F03D 11/0033; F05B 2240/14; Y02E 10/722; Y02E 10/726
See application file for complete search history.

(56) References Cited

U.S. PATENT DOCUMENTS

| | | | | |
|---|---|---|---|---|
| 3,919,956 A | * | 11/1975 | Invernizzi | 114/382 |
| 5,365,398 A | | 11/1994 | Briet | |
| 6,407,900 B1 | | 6/2002 | Nakano | |
| 6,457,943 B1 | * | 10/2002 | Olsen et al. | 416/230 |

(Continued)

FOREIGN PATENT DOCUMENTS

| CN | CN 1436283 A | 8/2003 |
|---|---|---|
| CN | 200950522 Y | 9/2007 |

(Continued)

OTHER PUBLICATIONS

"Technical Report IEC 61400-24, Wind Turbine generator systems, Part 24 Lightning Protection", Jul. 4, 2008.

(Continued)

*Primary Examiner* — Igor Kershteyn (57) ABSTRACT

A lightning protecting system for a nacelle of a wind turbine is described. The lightning protecting system includes a conductor device, which includes a core conductor, an isolating material surrounding the core conductor, and a shielding structure surrounding the isolating material, an input port, which is connected to a first end of the core conductor and which is adapted to be connected to the lightning rod, and an output port, which is connected to a second end of the core conductor and which is adapted to be connected to the support structure. Further described are a nacelle for a wind turbine, a wind turbine, a method for protecting a nacelle of a wind turbine, which all take benefit from the mentioned lightning protecting system. Furthermore, it is described a use for the mentioned lightning protecting system.

9 Claims, 4 Drawing Sheets

(56) References Cited

U.S. PATENT DOCUMENTS

| | | | | |
|---|---|---|---|---|
| 6,932,574 | B2 * | 8/2005 | Wobben | 416/146 R |
| 7,377,750 | B1 * | 5/2008 | Costin et al. | 416/146 R |
| 8,740,543 | B2 * | 6/2014 | Weaver | 415/4.1 |

FOREIGN PATENT DOCUMENTS

| | | |
|---|---|---|
| CN | 101336342 A | 12/2008 |
| EP | 1036937 A2 | 9/2000 |
| EP | 1522725 A2 | 4/2005 |
| WO | WO 9402980 A1 | 2/1994 |
| WO | WO 0014405 A1 | 3/2000 |
| WO | WO 0186144 A1 | 11/2001 |
| WO | WO 2007062659 A1 | 6/2007 |

OTHER PUBLICATIONS

Dehn, "HVI Conductor", http://www.dehnInternational.com/en/361/11220/Familie-html/11220/HVI%C2%AEConductor.html.

Yu Hao et al; "Modern Lightning Protection Technology Basis"; Meteorology Press; Sep. 1995; pp. 115.

Chinese Office Action dated May 22, 2015 for Correspondence Chinese App. No. CN 201080051168.5.

Chinese Search Report dated May 18, 2015 for Correspondence Chinese App. No. CN 20180051168.5.

* cited by examiner

FIG 1

LIGHTNING PROTECTION FOR A NACELLE OF A WIND TURBINE

CROSS REFERENCE TO RELATED APPLICATIONS

This application is the US National Stage of International Application No. PCT/EP2010/052278, filed Feb. 23, 2010 and claims the benefit thereof. The International Application claims the benefits of European Application No. 09014181.3 EP filed Nov. 12, 2009. All of the applications are incorporated by reference herein in their entirety.

FIELD OF INVENTION

The present invention relates to the field of wind turbines. In particular, the present invention relates to a lightning protecting system for a nacelle of a wind turbine. Further, the present invention relates to a nacelle for a wind turbine and to a wind turbine, which are equipped with the mentioned lightning protecting system. Furthermore, the present invention relates to a method for protecting a nacelle of a wind turbine from being corrupted by a lightning stroke and to a use of the mentioned lightning protecting system.

ART BACKGROUND

Known wind turbines, which provide a maximum power output of for instance 2.3 MW or 3.6 MW, comprise a nacelle respectively a nacelle canopy, which is typically made out of steel. Since steel is a stable material with a high electric conductivity the canopy is able to take and to sustain direct lightning strikes. Thereby, the canopy forms a Faraday cage, which surrounds (a) system components of the respective wind turbine and (b) people being situated inside the nacelle for instance in order to perform maintenance tasks.

A new generation of wind turbines will be equipped with a nacelle respectively with a nacelle canopy, which is made from a non-conductive material. Specifically, the canopy for a nacelle of a new type of wind turbine will be made from a non-metallic material such as for instance a glass fiber reinforced plastic.

In order to allow for a good shielding with respect to electromagnetic compatibility (EMC) the inside of a glass fiber canopy may be covered with a thin metal coating such as for instance a metallic paint. However, such a coating is typically not able to withstand or to handle currents, which are caused by a lightning stroke and which may have a peak current amperage up to 200 kA, as requested for lightning protection level 1 (see "Technical Report IEC 61400-24, Wind Turbine generator systems, Part 24: Lightning Protection"). Therefore, additional down-conductors will be necessary which electrically connect protective lightning rods, which are located atop the cooler and the generator of the wind turbine, to the bedplate of the nacelle. However, in case of a direct lightning such a down-conductor will have to carry a high lightning current through the inside of the nacelle. The resulting electromagnetic fields may harm electrically sensitive system components, which are located within the nacelle. Therefore, a lightning protection zone 2 (LPZ2) cannot be realized by using standard down-conductors from the lightning rods to the bedplate of the nacelle.

There may be a need for improving the lightning protection of a nacelle having a non-metal canopy.

SUMMARY OF THE INVENTION

This need may be met by the subject matter according to the independent claims. Advantageous embodiments of the present invention are described by the dependent claims.

According to a first aspect of the invention there is provided a lightning protecting system for a nacelle of a wind turbine, wherein the nacelle comprises a support structure, a canopy and a lightning rod. The provided lightning protecting system comprises (a) a conductor device, which comprises a core conductor, an isolating material surrounding the core conductor and a shielding structure surrounding the isolating material, (b) an input port, which is connected to a first end of the core conductor and which is adapted to be connected to the lightning rod, and (c) an output port, which is connected to a second end of the core conductor and which is adapted to be connected to the support structure.

The described lightning protection system is based on the idea that by introducing a special isolated conductor being placed within a shielding structure, a large current resulting from a lightning stroke can be directed through the interior or through a boundary area of a nacelle without causing a large electromagnetic radiation which could harm electric or electronic equipment being located within the nacelle.

Generally speaking, the basic idea the described lightning protection system is based on is to connect the lightning rod on and/or outside the canopy with the isolated core conductor. The isolated core conductor itself will be placed inside the shielding structure. Due to the isolation, the lightning induced current will only be conducted within the inside core conductor and not on the shielding structure. As a consequence, the emanating electromagnetic fields will be shielded up at least to a certain level by the shielding structure being placed around the isolated core conductor.

The mentioned shielding structure could be realized for instance by a (metal) tube or a flexible (metal) hose that is useable both for lightning protection and for shielding purposes.

It is noted that the nacelle may not only be equipped with only one lightning rod. If the nacelle comprises two or more lightning rods, one or more conductor devices can be employed. Specifically, one conductor device can be connected to one or more lightning rods, wherein in the latter case the first end has to be split into two or more first end portions.

It is further noted that within this document the term "connecting" or "connected" means electrically connected, if not mentioned otherwise. Thereby, the electrical connection may be established directly between the respective components or indirectly via one or more other components being electrically conductive.

According to an embodiment of the invention the conductor device is a coaxial cable.

The coaxial cable may be for instance the HVI™ cable produced by Dehn & Sohne GmbH and Co KG (http://www.dehn.de/), wherein HVI™ is a registered trademark (TM). The HVI™ cable is available in three different classifications (HVI™ cable I, HVI™ cable II and HVI™ cable III), wherein for effectively protecting a nacelle preferably the HVI™ cable I can be used. For further information about the HVI™ cables reference is made to the following internet address: http://www.dehn.de/de/newsletter/n11_08/DEHNinfo_1_08_1.pdf.

According to a further embodiment of the invention the lightning protection system further comprises (a) a further conductor device, which comprises a further core conductor, a further isolating material surrounding the further core conductor and a further shielding structure surrounding the further isolating material, (b) a further input port, which is connected to a first end of the further core conductor and which is adapted to be connected to the lightning rod, and (c) a further output port, which is connected to a second end of the further core conductor and which is adapted to be connected to the support structure.

The further conductor device may provide the advantage that the current resulting from a lightning stroke can be divided into (at least) two portions, wherein one portion is carried by the above mentioned core conductor and the other portion is carried by the further core conductor.

Generally speaking, by using multiple conductor devices or lightning protection system as described above, the current can be distributed and therefore a further reduction of the resulting electromagnetic fields can be achieved. Once a pulse of the lightning current has reached the nacelle support structure, the same electromagnetic compatibility (EMC) conditions as in actual wind turbines, such as for instance a 2.3 MW wind turbine produced by the Wind Power department of the company Siemens.

According to a further embodiment of the invention a first end of the shielding structure is connectable to a metallic layer, which is formed at the canopy. The metallic layer can be formed at an inner surface of the canopy, at an outer surface of the canopy and/or within a material being used for forming the canopy.

Connecting the first end of the shielding structure to the metallic layer of the canopy may provide the advantage that an improved electromagnetic shielding can be provided when a current pulse resulting from a lightning stroke propagates within the core conductor from the first end of the core conductor to the second end of the core conductor.

According to a further embodiment of the invention a second end of the shielding structure is connectable to the support structure.

Connecting the second end of the shielding structure with the support structure may also provide the advantage that an improved electromagnetic shielding can be realized.

In order to allow for a completely closed system, the shielding structure, e.g. a metal hose, will be connected on the one side to the metallic layer at the canopy and on the other side to the support structure of the nacelle.

According to a further aspect of the invention a nacelle for a wind turbine is provided. The provided nacelle comprises (a) a support structure, (b) a canopy being mechanically connected to the support structure, (c) a lightning rod, which is attached to the canopy, and (d) a lightning protecting system as described above. The input port of the lightning protecting system is connected to the lightning rod and the output rod of the lightning protecting system is connected to the support structure.

The described nacelle is based on the idea that by employing the above described lightning protecting system the electromagnetic compatibility (EMC) of the nacelle can be significantly improved in particular with respect to lightning strokes.

In this respect the term "attached" may mean that the lightning rod may be mechanically connected in a direct or in an indirect manner to the canopy.

According to an embodiment of the invention the canopy comprises a non-metal material being provided with a metallic layer. The non-metal material may be for instance a glass fiber reinforced plastic. This may provide the advantage that the canopy can be realized in a stable but lightweight manner.

The metallic layer may provide the advantage that the interior of the nacelle can be protected from unwanted electromagnetic radiation. Of course, as has already been described above, in case of a lightning stroke predominately the conductor device and in particular the core conductor and not the metallic layer will carry the resulting current from the lightning rod to the support structure of the nacelle.

According to a further embodiment of the invention the metallic layer comprises a metallic paint. This may provide the advantage that the electromagnetic compatibility (EMC) of the nacelle can be increased in an easy and effective manner.

Preferably, the metallic paint is attached on the inside of the canopy such that environmental influences, which could contribute to a removal of the metallic paint, are minimized.

According to a further embodiment of the invention the metallic layer comprises a laminated mesh. The lamination can be within or on an inner or an outer surface of the canopy.

It is mentioned that the laminated mesh can be used in combination with the use of the metallic paint preferably inside the canopy. The laminated or protective mesh may be made out of steel and/or out of any other suitable metal. The lamination may be performed within the non-metal material and in particular within the glass fiber of the canopy. Likewise as the metallic paint also the shielding structure (hose or tube) may be electrically connected to the laminated mesh.

According to a further aspect of the invention a wind turbine for generating electrical power is provided. The provided wind turbine comprises (a) a tower, (b) a nacelle as described above, wherein the nacelle is mounted in a rotatable manner to the tower, and (c) a rotor, which comprises at least one blade and which is attached to the nacelle.

The described wind turbine is based on the idea that by using the above described nacelle respectively by employing the above described lightning protection system for the nacelle the operation reliability of the wind turbine can be increased in particular in case a lightning stroke hits the nacelle respectively the canopy of the nacelle.

According to a further aspect of the invention a method for protecting a nacelle of a wind turbine from being corrupted by a lightning stroke is provided. Thereby, the lightning protecting system as described above is used. The nacelle comprises a support structure, a canopy and a lightning rod. The provide method comprises (a) connecting the input port to the lightning rod and (b) connecting the output port to the support structure.

Also the described lightning protection method is based on the idea that by using the above described lightning protection system for the nacelle the operation reliability of the nacelle and, as a consequence the operation reliability of the entire wind turbine, can be increased.

According to a further aspect of the invention there is provided a use of a lightning protecting system as described above for a nacelle of a wind turbine.

It has to be noted that embodiments of the invention have been described with reference to different subject matters. In particular, some embodiments have been described with reference to apparatus type claims whereas other embodiments have been described with reference to method or use type claims. However, a person skilled in the art will gather from the above and the following description that, unless other notified, in addition to any combination of features belonging to one type of subject matter also any combination between features relating to different subject matters, in particular between features of the apparatus type claims and features of the method or use type claims is considered as to be disclosed with this document.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION

The illustration in the drawing is schematically. It is noted that in different figures, similar or identical elements are provided with the same reference signs or with reference signs, which are different from the corresponding reference signs only within the first digit.

Figure 1:
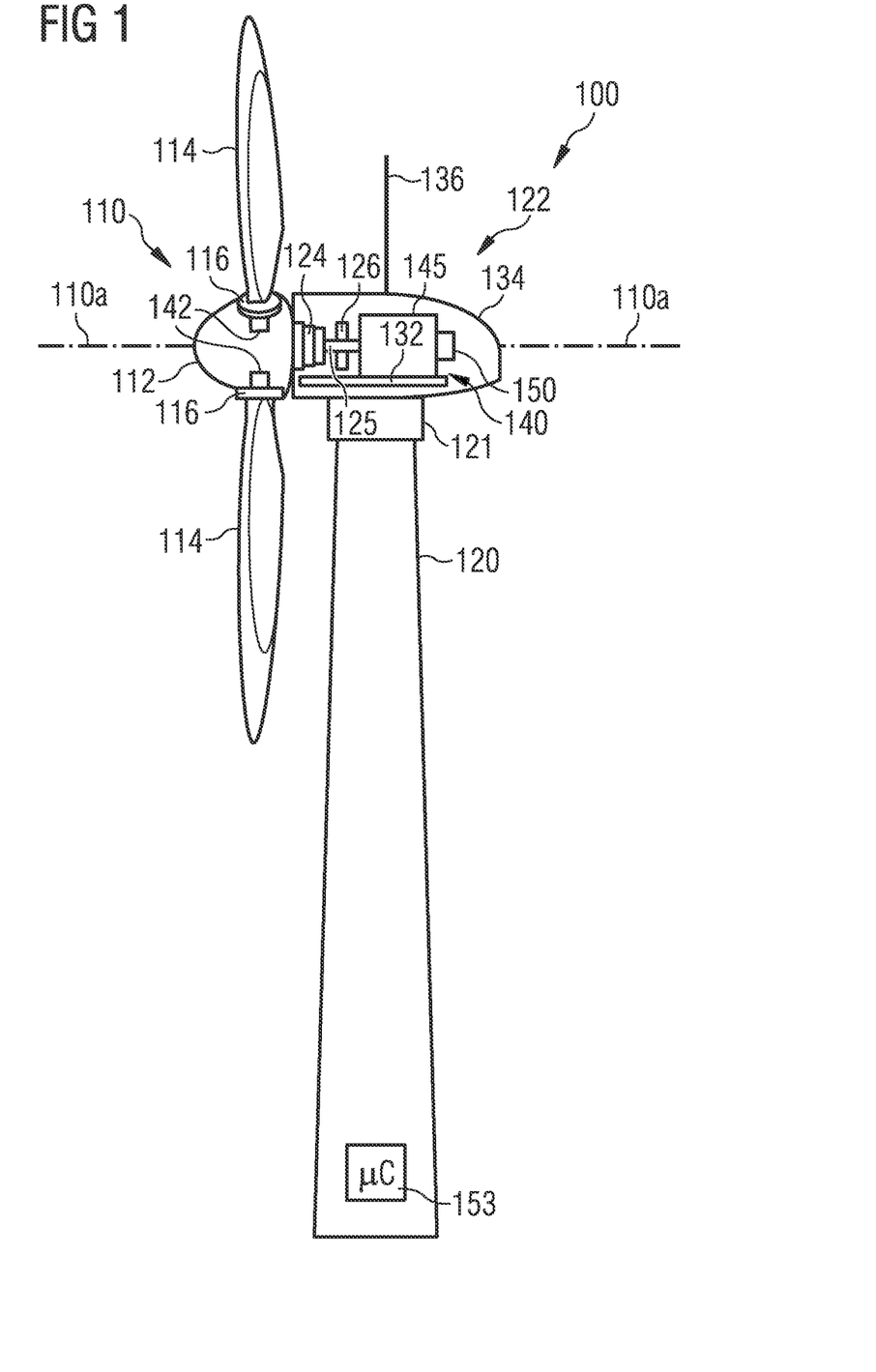
FIG. 1 shows a wind turbine according to an embodiment of the present invention.

FIG. 1 shows a wind turbine 100 according to an embodiment of the invention. The wind turbine 100 comprises a tower 120, which is mounted on a non-depicted fundament. On top of the tower 120 there is arranged a nacelle 122. In between the tower 120 and the nacelle 122 there is provided a yaw angle adjustment device 121, which is capable of rotating the nacelle 122 around a non depicted vertical axis being aligned with the longitudinal extension of the tower 120. By controlling the yaw angle adjustment device 121 in an appropriate manner it can be made sure, that during a normal operation of the wind turbine 100 the nacelle 122 is always properly aligned with the current wind direction. However, the yaw angle adjustment device 121 can also be used to adjust the yaw angle to a position, wherein the nacelle 122 is intentionally not perfectly aligned with the current wind direction.

As can be seen from FIG. 1, the nacelle 122 comprises a support structure 132, which is often simply called a bedplate, a canopy 134 for the equipment being situated within the nacelle 122 and a lightning rod 136, which according to the embodiment described here is located on top of the canopy 134.

The wind turbine 100 further comprises a rotor 110 having three blades 114. In the perspective of FIG. 1 only two blades 114 are visible. The rotor 110 is rotatable around a rotational axis 110a. The blades 114, which are mounted at a hub 112, extend radially with respect to the rotational axis 110a.

In between the hub 112 and a blade 114 there is respectively provided a blade adjustment device 116 in order to adjust the blade pitch angle of each blade 114 by rotating the respective blade 114 around a non depicted axis being aligned substantially parallel with the longitudinal extension of the blade 114. By controlling the blade adjustment device 116 the blade pitch angle of the respective blade 114 can be adjusted in such a manner that at least when the wind is not so strong a maximum wind power can be retrieved from the available wind power. However, the blade pitch angle can also be intentionally adjusted to a position, in which only a reduced wind power can be captured.

As can be seen from FIG. 1, within the nacelle 122 there is provided a gear box 124. The gear box 124 is used to convert the number of revolutions of the rotor 110 into a higher number of revolutions of a shaft 125, which is coupled in a known manner to an electromechanical transducer 140. The electromechanical transducer is a generator 140. However, it is mentioned that the application of the invention described in this document is not limited to a wind turbine which is equipped with a gear box. The described lightning protection can also be used for a so called direct-drive wind turbine.

Further, a brake 126 is provided in order to stop the operation of the wind turbine 100 or to reduce the rotational speed of the rotor 110 for instance (a) in case of an emergency, (b) in case of too strong wind conditions, which might harm the wind turbine 100, and/or (c) in case of an intentional saving of the consumed fatigue life time and/or the fatigue life time consumption rate of at least one structural component of the wind turbine 100.

The wind turbine 100 further comprises a control system 153 for operating the wind turbine 100 in a highly efficient manner. Apart from controlling for instance the yaw angle adjustment device 121 the depicted control system 153 is also used for adjusting the blade pitch angle of the rotor blades 114 in an optimized manner.

In accordance with basic principles of electrical engineering the generator 140 comprises a stator assembly 145 and a rotor assembly 150. The stator assembly 145 comprises a plurality of coils for generating electrical current in response to a time alternating magnetic flux. The rotor assembly comprises a plurality of permanent magnets, which are arranged in rows being aligned with a longitudinal axis of the rotor assembly 150.

Figure 2A:
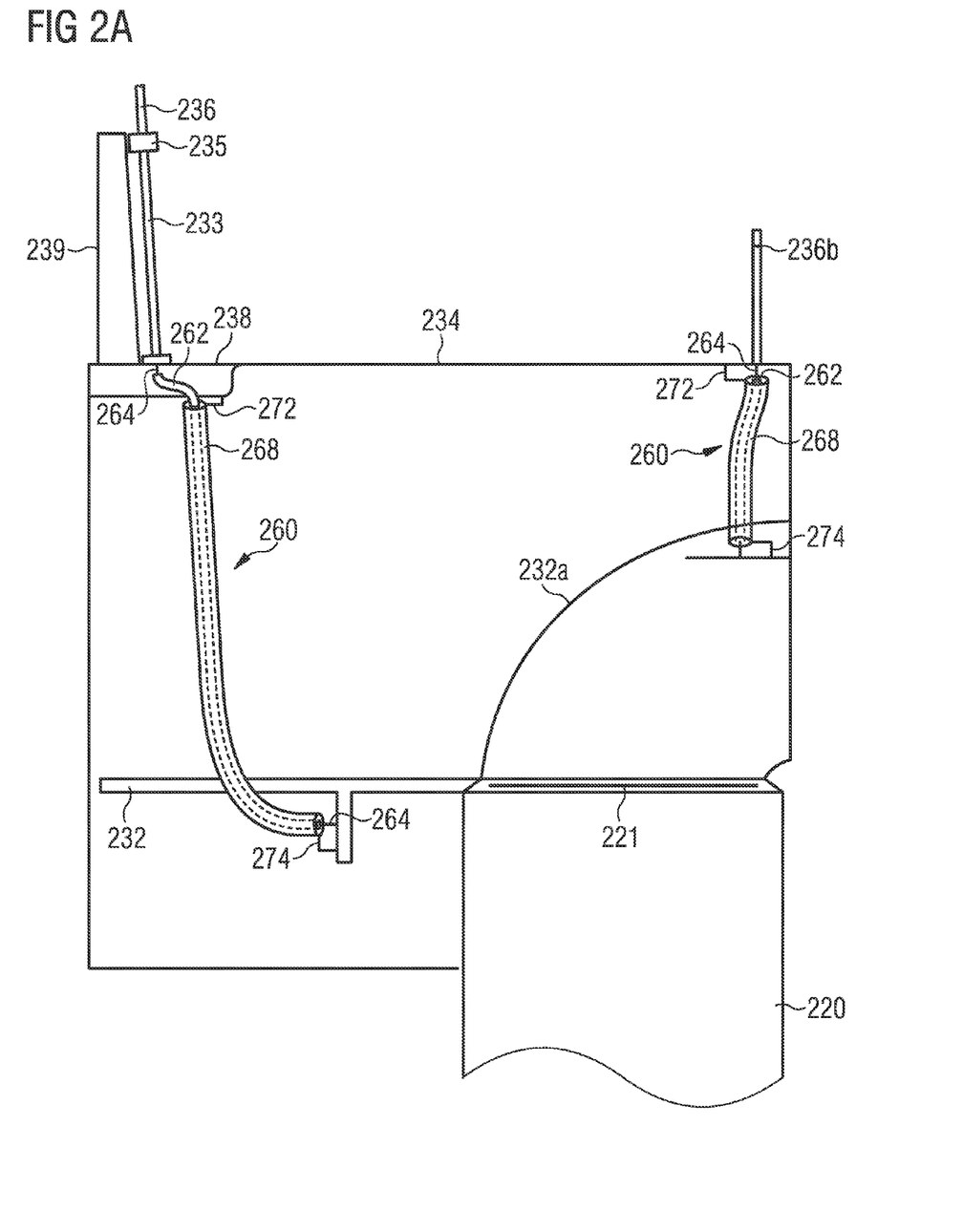
FIG. 2a shows a nacelle according to an embodiment of the present invention in a cross-sectional view, wherein the cross-section is oriented parallel to a rotor axis.
Figure 2B:
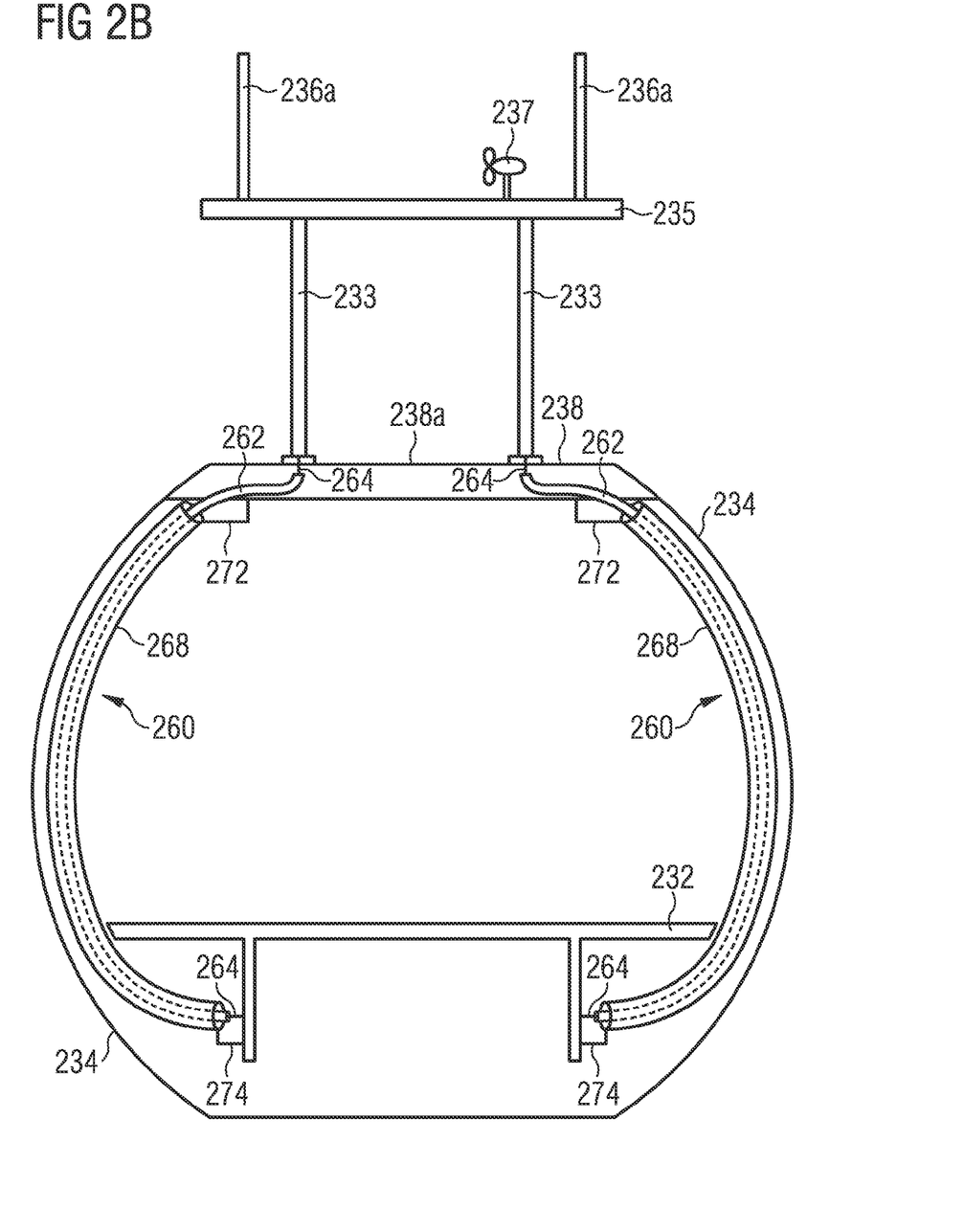
FIG. 2b shows the nacelle as illustrated in FIG. 2a in a cross-sectional view, wherein the cross-section is oriented perpendicular to a rotor axis and wherein the cross-section is taken at a rear end of the nacelle.

FIGS. 2a and 2b show a nacelle according to an embodiment of the present invention in cross-sectional views. FIG. 2a shows a cross-section which is oriented parallel to the rotor axis. FIG. 2b shows a cross-section which is oriented perpendicular to the rotor axis. The cross-section shown in FIG. 2b is taken at a rear end of the nacelle.

The nacelle comprises a support structure 232, which, although it not necessarily has the shape of a plate, is often also called a bedplate 232. The nacelle further comprises a canopy 234. The nacelle is mounted on top of a tower 220. A yaw angle adjustment device 221 is arranged between the tower 220 and load-bearing connection 232a between the tower 220 and the nacelle.

According to the embodiment described here the canopy 234 is made out of a reinforced glass-fiber material. However, in order to provide for an electromagnetic shielding the canopy 234 is either equipped with an EMC protective paint (not shown in FIGS. 2a and 2b) preferably on the inside of the glass-fiber material and/or with an EMC protective mesh (also not shown in FIGS. 2a and 2b) laminated into the glass-fiber material.

In the rear end of the canopy 234, which is on the left side in FIG. 2a, an additional outer glass-fiber cover plate 238 is situated, which on its upper side provides an even surface 238a. On this surface 238a there are disposed metallic support members 233, which carry an instrument carrying platform 235. On top of this platform 235 there are placed at least one air speed meter 237 and some lightning rods 236a.

According to the embodiment described here next to a support member 233 a heat exchanging device 239 is provided, which is used for transferring heat, which has been generated by the generator (not shown in FIGS. 2a and 2b), from the inside of the nacelle to the outside of the nacelle. As can be seen from FIG. 2a, the nacelle is equipped also with a further lightning rod 236b, which is directly placed on top of the canopy 234.

Conductor devices 260 are used to connect the lightning rods 236a, 236b to the support structure 232. For each lightning rod 236a, 236b preferably at least two conductor devices 260 (only one is shown in the FIGS. 2a and 2b) are used in order to divide a lightning current pulse into different parallel propagating current pulses. As a consequence, the resulting electromagnetic fields will be decreased.

Each conductor device comprises a High Voltage Insulated (HVI) cable 262. A HVI cable 262 comprises a core conductor 264, an isolating material and a shielding structure 268. The core conductor 264, the isolating material and the shielding structure 268 form a coax-cable type arrangement. The shielding structure 268 may be a metallic tube and/or a metallic hose.

The core conductor 264 of each HVI cable 262 is connected in the one end to the respective lightning rod(s) 236b or to the metallic support member 233 for the instrumental carrying platform 235, which carries the lightning rod(s) 236a. At the other end of the HVI cable 262, the respective core conductor 264 of each HVI cable 262 is connected to the support structure 232 of the nacelle, in particular to a lower side of the support structure 232.

In order to further decrease the resulting electromagnetic fields in case of a lightning hitting the nacelle, the shielding structures 268 are connected to the EMC shielding of the canopy 234 via electrical connections 272. In the lower end, the shielding structures 268 are connected to the support structure 232 via electrical connections 274.

Figure 3:
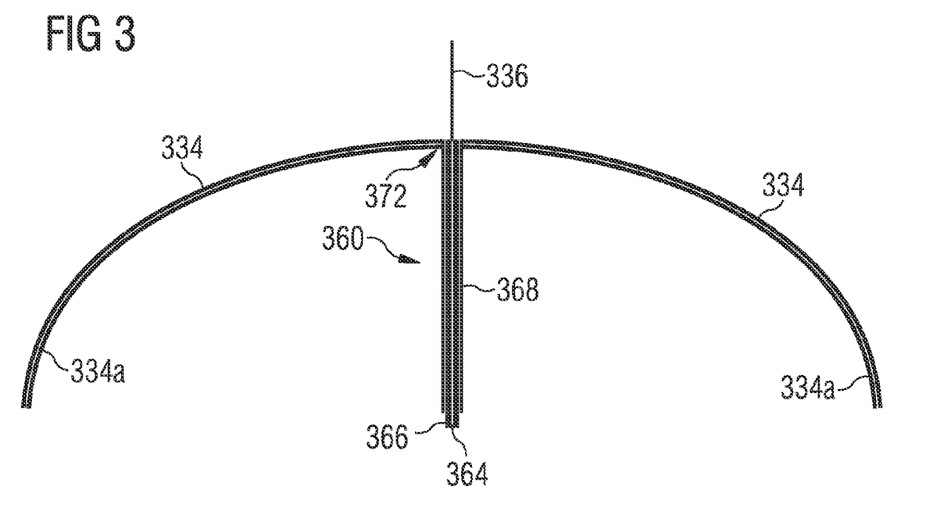
FIG. 3 schematically shows a top portion of a canopy of a nacelle, which is electrically connected to a lightning protecting system according to an embodiment of the present invention.

FIG. 3 schematically shows a top portion of a canopy 334 of a nacelle, which is electrically connected to a lightning protecting system in accordance with an embodiment of the present invention. The canopy 334 is made out of a glass-fiber structure, which on its inside is provided with a metallic paint 334a. A lightning rod 336 is mounted on top of the canopy 334. The lightning rod 336 is connected via a core conductor 364 of a conductor device 360 to a support structure (not shown) of the nacelle. The metallic paint 334a is connected via a shielding structure 368 to the support structure. The shielding structure 368 and the metallic paint 334a are electrically connected via an electrical connection 372.

An isolating material 366 is arranged between the core conductor 364 and the shielding structure 368.

Figure 4:
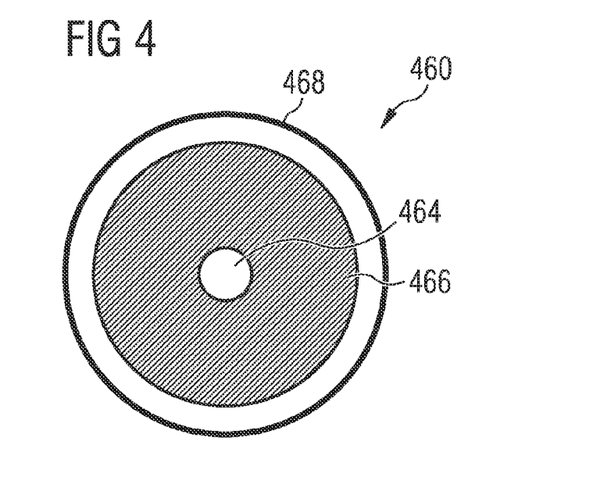
FIG. 4 shows a conductor device of the lightning protecting system in a cross-sectional view.

FIG. 4 shows a conductor device 460 of the lightning protecting system in a cross-sectional view. The conductor device 460 comprises a core conductor 464, an isolating material 466 and a shielding structure 468. The core conductor 464, the isolating material 466 and the shielding structure 468 form a coax-cable type arrangement.

In order to recapitulate the above described embodiments of the present invention one can state:

Using isolated conductor devices 260, 360, 460 inside the shielding structure 268, 368, 468 is a new and effective way to allow glass-fiber reinforced nacelle canopies 234, 334 to comply with lightning protection zone 2 requirements inside the nacelle. By connecting the shielding structure to the metallic paint 334a at the inside of the glass-fiber reinforced canopy 234, 334 and/or to a metallic mesh inside the glass-fiber reinforced material, the shielding abilities of this metallic paint 334a and/or of this metallic mesh will be extruded around the isolated core conductor 264, 364, 464. Therefore, it will be possible to guide lightning current pulses in arbitrary ways through the nacelle to the support structure 232 and still provide lightning protection zone 2 for the electronic equipment and personnel inside the nacelle.

Last but not least it is noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

LIST OF REFERENCE SIGNS 100 wind turbine
110 rotor
110a rotational axis
112 hub
114 blade
116 blade adjustment device
120 tower
121 yaw angle adjustment device
122 nacelle
124 gear box
125 shaft
126 brake
132 support structure/bedplate
134 canopy
136 lightning rod
140 electromechanical transducer/generator
145 stator assembly
150 rotor assembly
153 control system
220 tower
221 yaw angle adjustment device
232 support structure/bedplate
232a load-bearing connection between tower and nacelle
233 support member
234 canopy
235 instrumental carrying platform
236a lightning rod
236b further lightning rod
237 air speed meter
238 glass-fiber cover plate
238a upper surface
239 heat exchanging device for heat output of generator
260 conductor device
262 High Voltage Insulated (HVI) cable
264 core conductor
268 shielding structure/tube/metallic hose
272 electrical connection
274 electrical connection
334 canopy
336 lightning rod
334a metallic paint
360 conductor device
364 core conductor
366 isolating material
368 shielding structure/tube/metallic hose
372 electrical connection
460 conductor device
464 core conductor
466 isolating material
468 shielding structure/tube/metallic hose

The invention claimed is:
1. A nacelle for a wind turbine comprising:
a support structure,
a canopy being mechanically connected to the support structure, wherein the canopy comprises a non-metal material being provided with a metallic layer, a lightning rod, which extends outwardly of the canopy, and
a lightning protecting system comprising:
- a conductor device comprising:
  - a core conductor,
  - an isolating material surrounding the core conductor, and
  - a shielding structure surrounding the isolating material,
  - wherein a first end of the shielding structure is connected to the metallic layer of the canopy,
  - wherein a first end of the core conductor is connected to the lightning rod, and
  - wherein a second end of the core conductor is connected to the support structure.

2. The nacelle as set forth in claim 1, wherein the conductor device is a coaxial cable.

3. The nacelle as set forth in claim 1, wherein a second end of the shielding structure is connectable to the support structure.

4. The nacelle as forth in claim 1, wherein the metallic layer comprises a metallic paint.

5. The nacelle as forth in claim 1, wherein the metallic layer comprises a laminated mesh.

6. A wind turbine for generating electrical power, the wind turbine comprising
a tower,
the nacelle as set forth in claim 1, wherein the nacelle is mounted in a rotatable manner to the tower, and
a rotor, which comprises at least one blade and which is attached to the nacelle.

7. The nacelle as set forth in claim 1,
wherein the lightning protecting system includes an input port and an output port,
wherein the input port of the lightning protecting system is connected to the lightning rod and
wherein the output rod of the lightning protecting system is connected to the support structure.

8. The nacelle as set forth in claim 7 further comprising:
a further conductor device comprising:
- a further core conductor,
- a further isolating material surrounding the further core conductor, and
- a further shielding structure surrounding the further isolating material,
a further input port, which is connected to a first end of the further core conductor and which is adapted to be connected to the lightning rod, and
a further output port, which is connected to a second end of the further core conductor and which is adapted to be connected to the support structure.

9. A method for protecting a nacelle of a wind turbine from being corrupted by a lightning stroke, wherein the nacelle comprises: a support structure; a canopy mechanically connected to the support structure and comprised of a non-metal material being provided with a metallic layer; and a lightning rod extending outwardly from the canopy, the method comprising:
providing a lighting protecting system that comprises a conductor device comprising: a core conductor; an isolating material surrounding the core conductor; and a shielding structure surrounding the isolating material,
connecting a first end of the shielding structure to the metallic layer of the canopy,
connecting a first end of the core conductor to the lightning rod and
connecting a second end of the core conductor to the support structure.

* * * * *